June 4, 1935.  F. C. BURNETT ET AL  2,003,853
SPARE WHEEL CARRIER
Filed Sept. 18, 1933   2 Sheets-Sheet 1

Inventors
FRED C. BURNETT
and
GUY S. ADAMS
By Townsend F. Beaman
Attorney

June 4, 1935.   F. C. BURNETT ET AL   2,003,853
SPARE WHEEL CARRIER
Filed Sept. 18, 1933   2 Sheets-Sheet 2

Inventors
FRED C. BURNETT
and
GUY S. ADAMS
By *Laurence W Beaman*
Attorney

Patented June 4, 1935

2,003,853

UNITED STATES PATENT OFFICE 2,003,853

SPARE WHEEL CARRIER

Fred C. Burnett and Guy S. Adams, Jackson, Mich., assignors to Ryerson & Haynes, Inc., Jackson, Mich., a corporation of Michigan Application September 18, 1933, Serial No. 689,800

10 Claims. (Cl. 224—29)

The present invention relates to carrier mechanisms, particularly adaptable for the carrying of spare wheels upon vehicles.

An important object of the invention is to provide a carrier structure preferably having a hooked shaped ledge or the equivalent over which a part of the wheel is readily arranged, there being preferably a single manipulated member for securely and rigidly supporting the wheel upon the ledge, the wheel part being rocked into stressed engagement with the ledge upon manipulation of the member.

Other objects and advantages reside in the construction and arrangement and combination of parts as will be hereinafter set forth in the description to follow. The invention and scope thereof is clearly set forth in the appended claims.

Generally, the present invention resides in an improved carrier for spare wheels in which a supporting plate or other suitable structure upon which the wheel is mounted is supported from a bracket attached to the vehicle. A ledge of hook-shaped cross section is preferably carried by the upper portion of the supporting plate and spaced therefrom sufficiently to readily receive a part of the wheel such as the inner hub flange. Below and laterally spaced from the ledge at opposite sides are members constituting a fulcrum which may conveniently take the form of lugs or projections pressed from the supporting plate. These lugs project out of the plane of the supporting plate and are positioned to be engaged by rear face of the inner hub flange at the sides thereof. With the wheel suspended by its inner flange, for example, from the ledge, suitable structure is provided for drawing the lower part of the inner hub flange inwardly to rock the central portion thereof about the fulcrum to urge the upper portion of the hub flange into rigid engagement with the ledge, particularly the forward portion thereof.

Figure 1:
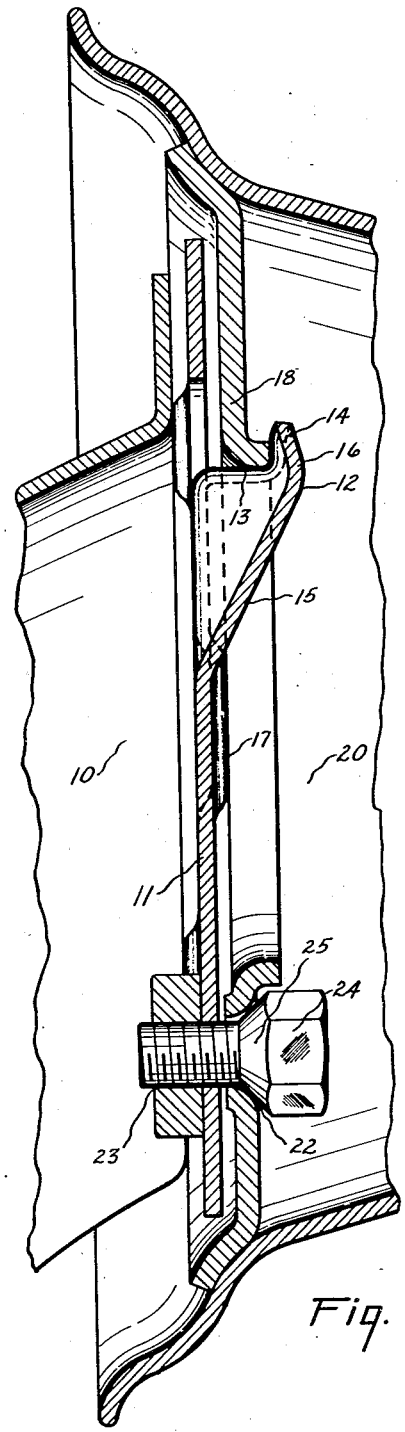
Fig. 1 is an enlarged fragmentary cross sectional view through the improved carrier with the inner hub flange of a wheel in position, the section through the supporting plate being taken on line 1—1 of Fig. 2.

Having specific reference to the drawings, a carrier for spare wheels is shown in Fig. 1 consisting of a bracket 10 of suitable construction to which is attached, by rivets, bolts, or the like, a supporting plate 11 constituting a seat for the hub flange of the wheel. A ledge 12 is preferably formed by lancing the plate 11 and forming the severed metal into the desired shape which may have a base portion 13 with the same curvature as the inner hub flange, and a shoulder or abutment 14. To strengthen the ledge 12, reinforcing ribs 15—16 may be formed in the plate beneath the ledge and the shoulder, respectively. Lugs or projections 17 are illustrated as forming from the plate 11 and protrude outwardly from the plane thereof. These lugs are located below the ledge 12 and are laterally spaced at both sides thereof sufficiently to engage the outer face of the inner hub flange 18 of the wheel 20. Apertures 21 are provided in the supporting plate 11 for conveniently riveting or bolting the same to the bracket 10.

In the mounting of the wheel upon the carrier, the upper part of the flange 18 is received upon the ledge 12. One convenient way of securing the flange in position is to index the same until one of the several apertures 22 of the flange is in substantial alignment with a threaded aperture 23 in the plate 11. Preferably with the flange 18 freely suspended upon the ledge 12 the apertures 22—23 will not be exactly coaxial; instead, the axis of the aperture 22 in the hub flange will be located slightly above so that when the cap screw 24 is tightened up the conical portion 25 thereof will engage the lower portion of the aperture 22 and exert a downwardly directed camming action drawing the upper portion of the flange into firm engagement with base portion 13 of the ledge 12. At the same time the hub flange is being urged downwardly by the drawing up of the cap screw, it will also be rocked about the lugs 17 as a fulcrum urging the upper portion of the flange outwardly into rigid engagement with the shoulder or abutment 14. From this it should be apparent that upon the drawing up of a single securing means, the hub flange is urged into rigid engagement with fixed spaced surfaces located upon opposite sides of the flange, namely, the abutment 14 and the lugs 17. With the supporting plate 11 of sheet metal, the ledge 12 will be sufficiently flexible to provide adequate yield between the coacting part to prevent wearing loose. Preferably, the relative axial spacing of the lugs 17 and abutment 14 is such that the lower portion of the hub flange is not drawn into contact with the plate 11 with the cap screw properly drawn up. This provides for reasonable wearing of the abutment 14 and lugs 17.

Figure 3:
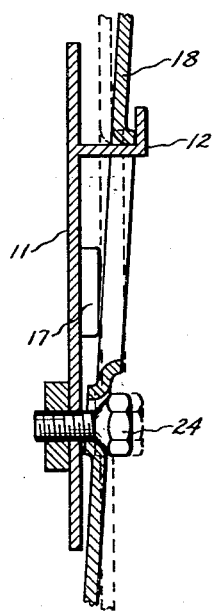
Fig. 3 is a diagrammatical representation of the rocking action of the wheel upon manipulation of the securing member.

In Fig. 3 the rocking action of the flange about the lugs 17 as a fulcrum is diagrammatically shown. The dotted line presentation is that of the hub flange freely received within the hook-shaped ledge 12 for suspending the wheel therefrom. The full line presentation shows the position the flange takes upon the drawing up of the cap screw resulting in the rocking of the flange about the lugs 17 as a fulcrum.

Figure 2:
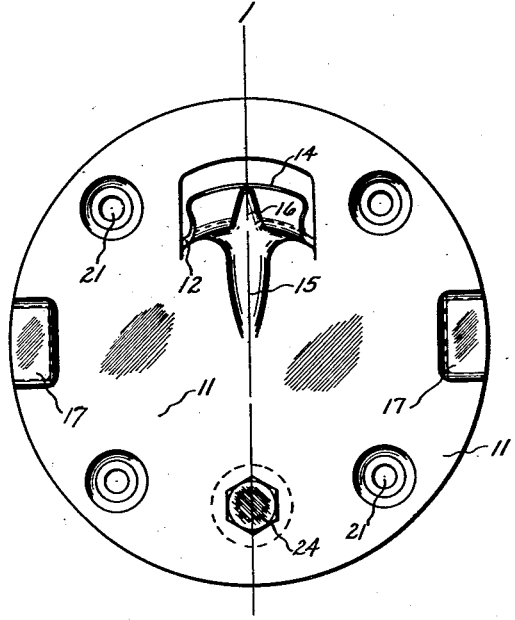
Fig. 2 is a front elevation of the supporting plate detached from the carrier bracket.
Figure 4:
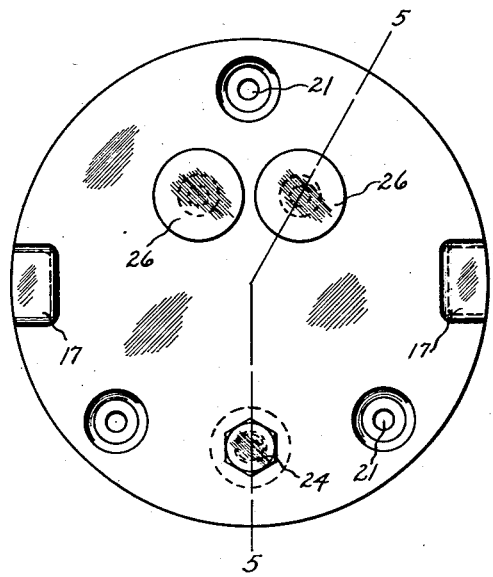
Fig. 4 is a front elevation of a slightly modified construction.
Figure 5:
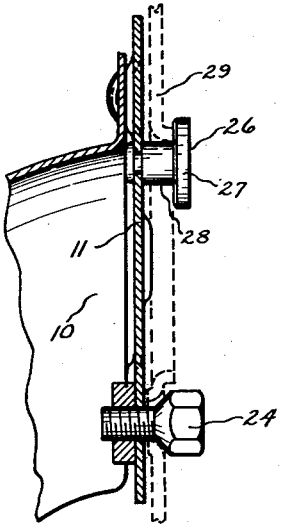
Fig. 5 is a cross sectional view taken on line 5—5 of Fig. 4.

As will be clearly understood, the supporting ledge for the hub flange may take innumerable forms. For example in Figs. 4 and 5 a pair of stepped rivets 26 are employed presenting abutments 27 and a base 28 for receiving the hub flange 29. The remaining structure may be identical with that shown in Figs. 1 and 2.

Figure 6:
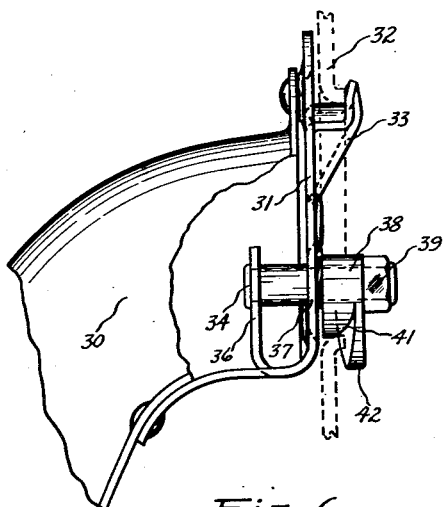
Fig. 6 is a side elevational view of a further modified form of the invention.
Figure 7:
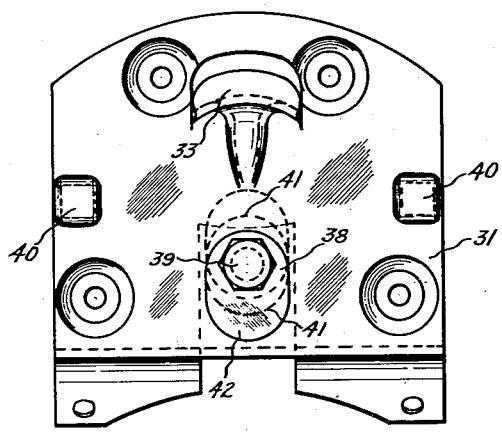
Fig. 7 is a front elevation of the supporting plate shown in Fig. 6 removed from the carrier bracket.

In Figs. 6 and 7, a modified form of the invention is shown applied to a spare wheel carrier of the type disclosed in application, Serial No. 670,-132, filed May 9th, 1933. A bracket 30 of suitable construction has secured thereon a plate 31 forming a vertical seat for the hub flange 32. A hook-shaped ledge 33 is adapted to receive the upper portion of the hub flange to either suspend the wheel therefrom or support the same in a vertical position in a fender well. A stud 34 supported at 36 in the plate 31 has a cam 38 rotatably mounted thereon. A nut 39 is integrally attached to the cam 38 to permit manipulation of the same by suitable tools. Lugs or projections 40 which correspond to the lugs 17 in location and function are formed in the plate 31. For urging the hub flange downwardly and rocking the same inwardly about the lugs 40 as a fulcrum, the cam has a lobe at 41 contiguous with a tapered flange portion 42. With the hub flange vertically seated against the plate 31, rotation of the cam 38 from the dotted line position in Fig. 7 to the full line position will result in the lower portion of the hub flange 32 being urged downwardly and at the same time inwardly rocking the same about the lugs 17 as a fulcrum. As in the construction disclosed in Figs. 1 and 2, the rocking of the hub flange results in urging the same into rigid engagement with the vertical disposed portion of the hook-shaped ledge. As fully described in the aforesaid application, the hub flange will be urged by the cam into engagement with the ledge by the rotation of the cam when the wheel is to be suspended therefrom. However, when the rotation of the cam is employed to urge the spare wheel downwardly into the spare wheel fender well the hub flange will not be drawn down into contact with the base of the ledge but will be spaced therefrom and merely guided by the vertically disposed portion of the ledge and restrained against lateral movement.

In the foregoing description the details of construction of the embodiments illustrated have been set forth in specific terms in order that the present invention may be fully understood and not with the thought of placing any unwarranted limitation upon its scope. Obviously, changes and modifications of the specific structure illustrated readily suggest themselves. For example, the supporting ledge and lugs constituting the fulcrum may be cast in one structure or they may be integral with the bracket attached to the vehicle. The lugs or projections themselves may take innumerable forms and shapes; it being only essential that a surface is provided about which a part of the wheel may be rocked as a fulcrum. Furthermore, in some cases it may be found satisfactory to employ only a single lug or projection about which to rock the wheel as a fulcrum.

In its broadest aspect, the present invention is considered as residing in a support or guide over which a part of the spare wheel may be readily received and means for rocking the wheel about a fulcrum to urge the same into stressed engagement with fixed surfaces for steadying the same.

Having described our invention, what we claim as new and desire to protect by Letters Patent is:

1. In a spare wheel carrier, the combination of a bracket, a ledge of hook-shaped cross section supported by said bracket on which the hub flange of the wheel is arranged to suspend the wheel therefrom, a fulcrum mounted on said bracket below said ledge and engageable with the rear face of said hub, and securing means located below said fulcrum and in substantially vertical alignment with said ledge, engageable with said hub and acting to rock the wheel upon said fulcrum to urge said hub into rigid engagement with said ledge.

2. A spare wheel carrier comprising, the combination with a surface of a ledge extending from said surface on which the upper portion of the hub flange of the wheel is arranged to suspend the wheel therefrom, a shoulder portion associated with said ledge and located on one face of the hub flange when the same is suspended upon said ledge, fulcruming means located on the other face of said hub flange extending from said surface and below said ledge, and means engageable with the lower portion of said hub flange for rocking the hub flange about said fulcruming means and for urging the upper portion of said flange into rigid engagement with said shoulder.

3. A spare wheel carrier comprising the combination with a surface of means extending from said surface upon which a part of the hub of the wheel is freely hooked over to support the same, means extending from said surface below said supporting means about which the wheel is adapted to rock as a fulcrum, and means engageable with a diametrically opposite part of the hub of said wheel for rocking the same about said second means into rigid engagement with said supporting means whereby the wheel is rigidly supported.

4. A spare wheel carrier comprising the combination with a surface of means extending from said surface upon which the hub of the wheel is freely received for supporting the same, fulcruming means extending from said surface about which the wheel is adapted to rock, and securing means engageable with said hub for rocking said wheel into rigid engagement with said first means whereby the wheel is rigidly supported.

5. A spare wheel carrier comprising means upon which an upper part of the wheel is freely received for supporting the same, fulcruming means about which the wheel is adapted to rock, and securing means engageable with a lower part of said wheel for rocking and camming said wheel inwardly and downwardly into rigid engagement with said first means whereby the wheel is rigidly supported.

6. A spare wheel carrier comprising the combination with a surface of upper means extending from said surface upon which the hub of the wheel is freely received for supporting the same, spaced intermediate fulcruming means extending from said surface about which the wheel is adapted to rock, said first means including an abutment axially spaced from said fulcruming means, and securing means extending from said surface engageable with the hub of said wheel spaced from said first part for rocking said first part outwardly into rigid engagement with said abutment and said second part inwardly.

7. In a spare wheel carrier, the combination of a bracket, a supporting plate secured to said bracket presenting a seat for the hub flange of a wheel to be carried, an abutment associated with said seat, means projecting out of the plane of said plate to form a fulcrum about which said flange is adapted to rock, securing means engageable with said flange for urging the same toward said plate, said flange under the influence of said securing means being rocked about said fulcrum into rigid engagement with said abutment.

8. In a spare wheel carrier, the combination of a support forming a vertical seat for the hub flange of a wheel to be carried, a substantially horizontal ledge having an abutment associated therewith, said abutment being spaced from said support, means projecting out of the plane of said support to form a fulcrum about which said hub is adapted to rock, securing means engageable with said hub urging the same inwardly toward said support, said hub under the influence of said securing means being rocked about said fulcrum into engagement with said abutment whereby the wheel is rigidly carried on said support.

9. In a spare wheel carrier, the combination of a support forming a vertical seat for the hub flange of a wheel to be carried, a substantially horizontal ledge having an abutment associated therewith for receiving the hub flange, means associated with said support forming a fulcrum about which said hub flange is adapted to rock, and camming mechanism engageable with said hub flange for urging the same downwardly into firmer engagement with said vertical seat and inwardly to rock the same about said fulcrum into rigid engagement with said abutment.

10. In a spare wheel carrier, the combination of a support forming a vertical seat for the hub flange of a wheel to be carried, a substantially horizontal ledge having an abutment associated therewith for receiving the hub flange, means carried by said support below said ledge and located to be engaged with one side of said hub flange and about which said hub flange is adapted to be rocked as a fulcrum, a single securing means located directly below said ledge and engageable with said hub flange for urging the same downwardly and for rocking the same inwardly about said fulcrum into rigid engagement with said vertical seat.

FRED C. BURNETT.
GUY S. ADAMS.